March 27, 1951
E. G. GRINHAM ET AL
2,546,440
REMOTE CONTROL MECHANISM OF CHANGE-SPEED
GEARING OF A MOTOR VEHICLE
Filed March 5, 1948
4 Sheets-Sheet 1
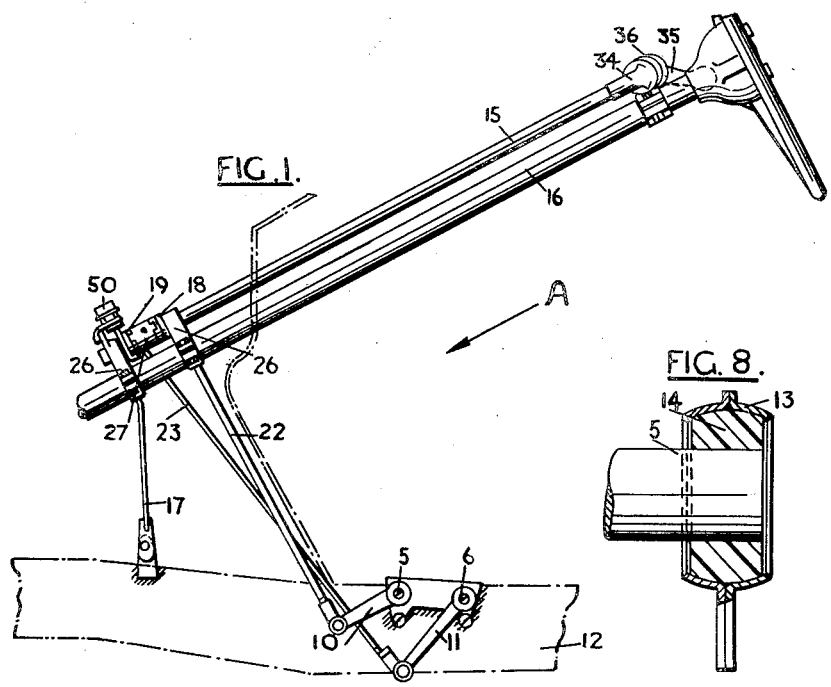
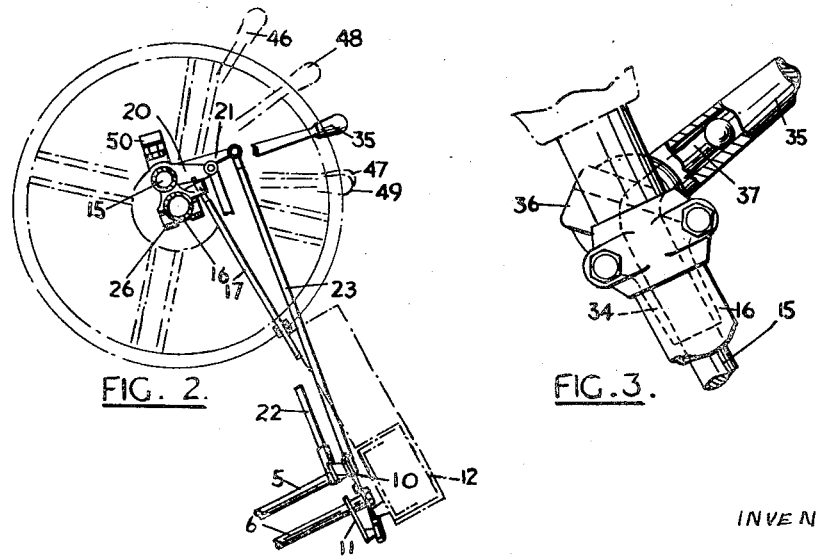
INVENTORS
E. G. GRINHAM &
W. R. TURNER
By Mawhinney & Mawhinney
ATT'YS.

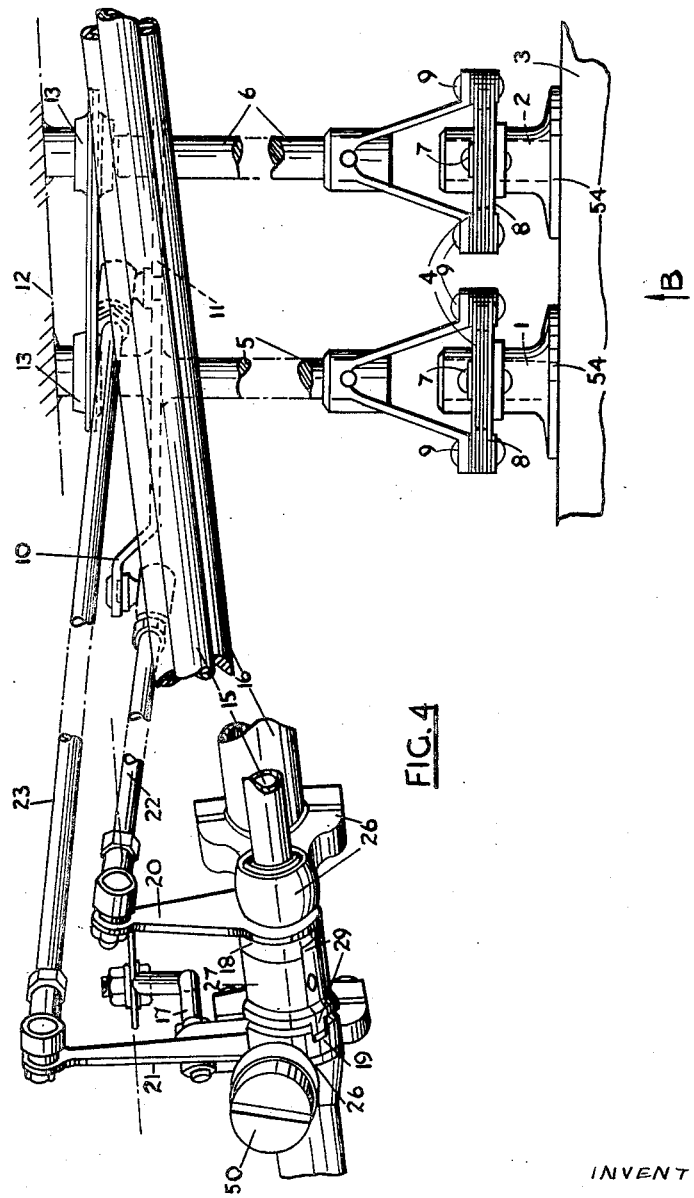

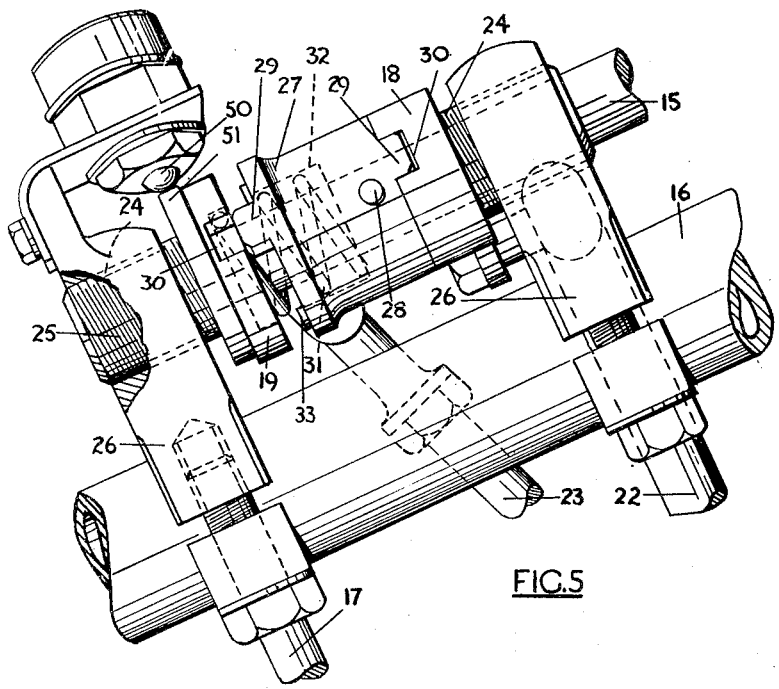
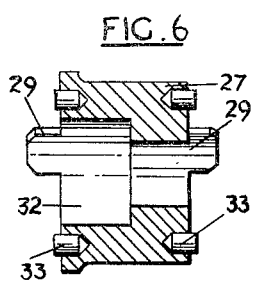
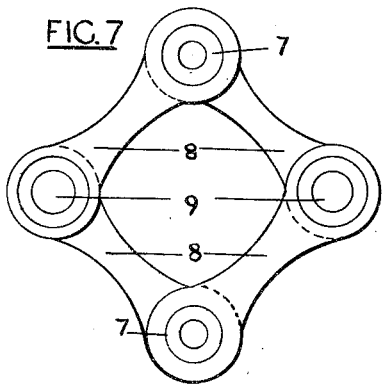

Patented Mar. 27, 1951

2,546,440

UNITED STATES PATENT OFFICE 2,546,440

REMOTE CONTROL MECHANISM OF CHANGE-SPEED GEARING OF A MOTOR VEHICLE

Edward G. Grinham and Walter Raymond Turner, Coventry, England, assignors to The Standard Motor Company Limited, Coventry, England Application March 5, 1948, Serial No. 13,294
In Great Britain November 5, 1947

4 Claims. (Cl. 74—473)

This invention relates to a change-speed mechanism, of a motor-vehicle, of the kind having three forward speeds and reverse, the four speeds being introduced by a pair of double-acting striking forks or the equivalent—i. e., the term "striking fork" is used herein in a generic sense to include any suitable gear-shift member.

Our object is to provide a simple form of remote control, for such a change-speed mechanism, which can be actuated easily and will positively introduce the selected speed, and which will not be effected by relative movements occurring between the casing of the change-speed mechanism and the part upon which the actuating lever of the control is mounted—for it is usual for the said casing, fast with the engine, to be rubber mounted, so that it can rock.

A further object is to provide a change-speed mechanism which can be adapted, in a very simple manner, to be remotely controlled from either side of the vehicle.

According to the main feature of the invention, the striking forks are respectively actuated by angularly-movable driven dog members coacting with an angularly-movable and axially-slidable driving dog member which in its extreme axial positions engages with the driven dog members, respectively, whilst leaving the other free, the driving dog member being movable axially only when both driven dog members are in the neutral position; in combination with any suitable means providing an interlock between the striking forks whereby when one is not in the neutral position the other is held in the neutral position.

The driven dog members are preferably free on an angularly and axially movable actuating spindle having fast on it the driving dog member.

Preferably, too, a rubber or like cushion is provided between the coacting faces of the dog members whereby to take up shock when the actuating spindle is moved axially.

Conveniently the striking forks are respectively actuated by angularly-movable shafts re-journalled in the casing of the change-speed mechanism and connected through flexible coupling members to driving shafts universally mounted on the chassis-frame, the latter shafts having actuating arms, near where they are journalled, which can in consequence remain substantially stationary when the said casing rocks relatively to the chassis-frame, the driven dog members, having arms linked to those of the said driving shafts, being rigidly supported from the chassis-frame.

The term "chassis-frame" is used herein to include those cases in which the chassis-frame is constituted wholly or in part by the body of the vehicle.

In the accompanying drawings:

Figure 1 is an elevation of the steering column, of a motor-vehicle, having fitted to it a remote control mechanism, according to the invention, for the change-speed mechanism, of the kind aforesaid, with which the vehicle is fitted;

Figure 2 is a part-sectional axial view looking in the direction of the arrow A of Figure 1;

Figure 3 is a fragmentary part-sectional elevation, to a larger scale, showing the connection of the actuating lever with an angularly-movable, axially-slidable spindle on which the driving dog member is fast;

Figure 4 is a fragmentary plan, to the same scale as Figure 3, mainly of the parts shown by Figure 1;

Figure 5 is an enlarged elevation mainly of the driving and driven dog members, the view being taken from the same position as that of Figure 1;

Figure 6 is a fragmentary section, to the enlarged scale of Figure 5, of the driving dog member;

Figure 7 is an elevation of one of the couplings shown in Figure 4, but to a larger scale;

Figure 8 is a sectional elevation of a ball mounting hereinafter described;

Figure 10:
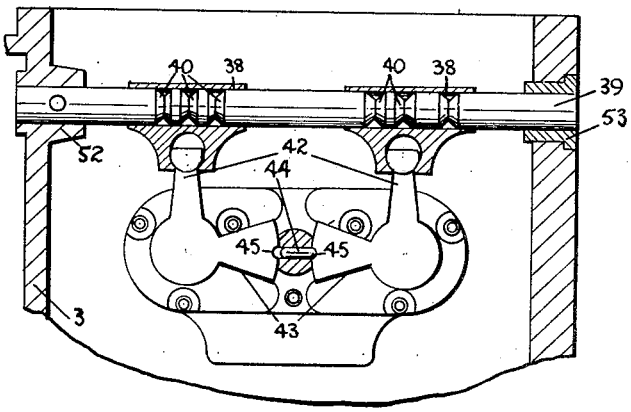
Figure 10 is a representation of one form of interlock, in the interior of the casing of the change-speed mechanism, between the two double-acting striking forks, being an elevational view looking in the direction of the arrow B in Figures 4 and 9.

In the construction shown the change-speed mechanism has two short angularly-movable shafts 1, 2 (Figure 4) extending side-by-side from its casing 3, and each is connected through a flexible coupling 4 to a driving shaft 5, 6, respectively. Each coupling is shown (Figure 7) as comprising a pair of pins 7, fast with a hub on one shaft, connected by a plurality of flexible strips 8 to an angularly-spaced pair of pins 9 fast with a hub on the other shaft. The driving shafts 5, 6 are journalled at their other ends, where they carry arms 10, 11 (Figure 1), in ball-type bearings on the chassis-frame 12. Each of the latter bearings is shown (Figure 8) as including a socket casing 13 with an annular ball part 14 within it, the shafts 5, 6 each taking a bearing support in the associated ball part 14.

The actuating spindle 15 is supported from and alongside the casing 16 of the steering column, and a rigid bracket 17 (Figure 1) connects the chassis-frame 12 with the steering column casing 16 where the two driven dog members 18, 19 are rotatively mounted on the actuating spindle 15. The driven dog members are fast with arms 20, 21 (Figures 2 and 4) which are respectively linked at 22, 23, to the arms 10, 11 on the aforesaid driving shafts. Each driven dog member is fast with a sleeve 24 having an external screw-thread 25 (for journalling purposes) engaged with a corresponding screw-thread in a clip 26 carried by the casing 16.

Between the two driven dog members is a driving dog member 27 fast with the actuating spindle 15, being held thereto by a pin 28, the latter dog member having on opposite faces at least one driving dog 29 which is conveniently rounded somewhat to engage easily with a corresponding recess 30 in the adjacent driven dog member. The arrangement is preferably such that when one of the driving dogs 29 is fully engaged with the recess 30 of the associated driven dog member the other driving dog 29 is only just clear of the associated driven dog member, as shown by Figure 5, whereby the actuating spindle 15 is axially locked once it has been angularly turned. A spring 31 may be provided to bias the driving dog member axially in a selected direction, for example, against gravity, the spring being arranged in a recess 32 of the driving dog member.

As a cushion for the dog members the driving dog member may have a bore in it in which is mounted a rubber cylinder 33 extending from the end of the bore. As a further cushion it is preferred that the joints at the ends of the two links 22, 23 should incorporate rubber or like sleeves.

The upper end of the actuating spindle 15 extends into a casing 34, fast with the casing 16, on which a hollow actuating lever 35 is ball-mounted at 36, and extending into the interior of the lever is a cranked end 37 (Figure 3) of the actuating spindle. Thus, depression of the actuating lever 35 will select the lower driven dog member 19, and raising of the lever the upper driven dog member 18, whilst in either of the extreme axial positions of the actuating spindle the lever can be moved to turn the actuating spindle angularly.

As will be understood, axial movement of the actuating spindle selects the striking forks and angular movement of the spindle actuates the selected striking fork.

In the intermediate position of the actuating spindle, in which the driving dog member engages both driven dog members, it cannot be turned angularly owing to the provision of the aforesaid interlock.

Figure 9:
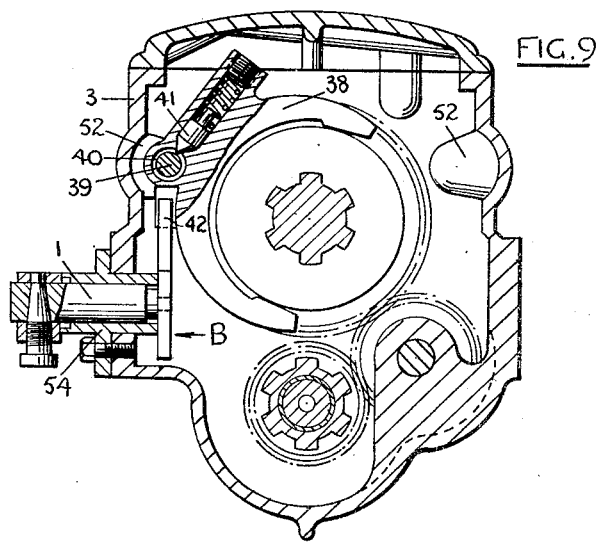
Figure 9 is a transverse section through the change-speed mechanism.

The latter is conveniently arranged within the casing of the change-speed mechanism, as shown by Figures 9 and 10 to operate between the two double-acting striking forks 38, which are slid axially by the turning of the respective shafts 1, 2. The striking forks 38 are shown as being supported upon a fixed rod 39 having two sets of angular grooves 40 respectively to coact, in a known manner, with spring-pressed plungers 41 carried by the striking forks to assist in accurately positioning the striking forks for the selected gear or neutral.

Each of the shafts 1, 2, is fast with an arm 42 by which the associated striking fork is actuated, and also with a sector 43, the two sectors extending towards one another. The interlock is shown as including a guided plunger 44 extending between the two sectors to coact with appropriate recesses 45 therein such that it is just clear of one sector when engaged fully in the recess of the other sector, and vice versa, axial movement of a sector, in the recess 45 of which the plunger 44 is fully engaged, serving for driving out the plunger into the recess of the other sector. The two recesses 45, it will be understood, are only aligned with the plunger 44 when both striking forks are in the neutral position, as shown in Figure 10.

In the present instance the upper dog member 18 is associated with 3d and 2d speed, and the lower 19 with 1st speed and reverse gear. The corresponding positions of the actuating lever are shown by the chain lines in Figure 2, 46 representing reverse gear, 47 1st speed, 48 2d speed, and 49 3d speed. In the reverse gear position a reversing light (not shown) is energized through a switch 50 operable by an abutment 51 (Figure 5) on the lower dog member 19.

The casing 3 of the change-speed mechanism is substantially symmetrical about a central longitudinal plane, so that the mechanism can be adapted for remote control from either the right or left-hand side. Thus, a hole in the appropriate boss 52, and an aligned hole for the bush 53, can be machined for the fixed rod 39. Similarly, holes can be machined in the appropriate side of the casing 3 for the flanged bearing bushes 54, 54 for the shafts 1 and 2.

What we claim as our invention and desire to secure by Letters Patent of the United States is:

1. Remote control means, for an automobile change-speed mechanism having two double-acting striking forks, including two angularly-movable shafts journalled in the casing of said change-speed mechanism and connected to actuate said striking forks respectively, two angularly-movable shafts universally mounted to be substantially aligned with those first-mentioned, flexible couplings respectively joining together each pair of aligned shafts, angularly-movable axially-fast driven dog members, means to respectively connect said driven dog members to said second-mentioned two shafts, an angularly and axially movable driving dog member coacting with either of said driven dog members to respectively engage therewith in its extreme axial positions whilst leaving the other free, said driving dog member arranged relatively to said driven dog members to be axially movable only when both said driven dog members are in the neutral positions, and means providing an interlock between said striking forks whereby when one is not in the neutral position the other is held in the neutral position.

2. In an automobile having a chassis, a change-speed mechanism having a casing and a pair of double-acting striking forks, two angularly-movable shafts which are journalled in said casing and connected to actuate said striking forks respectively, two more angularly-movable shafts which are generally aligned with those first-mentioned shafts respectively and are universally mounted on said chassis, flexible couplings respectively joining together each pair of aligned shafts, a remote control means for said change-speed mechanism, a support for said remote control means fast with said chassis, and means operatively interconnecting said remote control means and said two second-mentioned shafts.

3. The combination of claim 2, in which each of the universal mountings for said two second-mentioned shafts includes a housing fast with said chassis, and a resilient ring in said housing, said ring slidably mounted on the associated shaft.

4. The combination of claim 2, in which each of said interconnecting means includes a crank arm mounted on the associated of said second-mentioned shafts adjacent the universal mounting therefor.

EDWARD G. GRINHAM.
WALTER RAYMOND TURNER.

REFERENCES CITED

The following references are of record in the file of this patent:

UNITED STATES PATENTS

| Number | Name | Date |
|---|---|---|
| 1,775,754 | Fageol | Sept. 16, 1930 |
| 2,029,165 | Hadley et al. | Jan. 28, 1936 |
| 2,171,953 | Seaholm | Sept. 5, 1939 |
| 2,193,230 | Ferguson | Mar. 12, 1940 |
| 2,231,966 | Swennes | Feb. 18, 1941 |
| 2,275,779 | MacPherson | Mar. 10, 1942 |
| 2,317,761 | Haight | Apr. 27, 1943 |
| 2,324,732 | Slack | July 20, 1943 |
| 2,334,421 | Leach | Nov. 16, 1943 |
| 2,380,390 | Banker | July 31, 1945 |
| 2,386,174 | Randol | Oct. 2, 1945 |

FOREIGN PATENTS

| Number | Country | Date |
|---|---|---|
| 522,969 | Great Britain | July 2, 1940 |